Feb. 23, 1971   A. WARSHAW   3,565,575
REMOVAL OF NITROGEN OXIDES FROM A GAS STREAM
Filed May 22, 1968
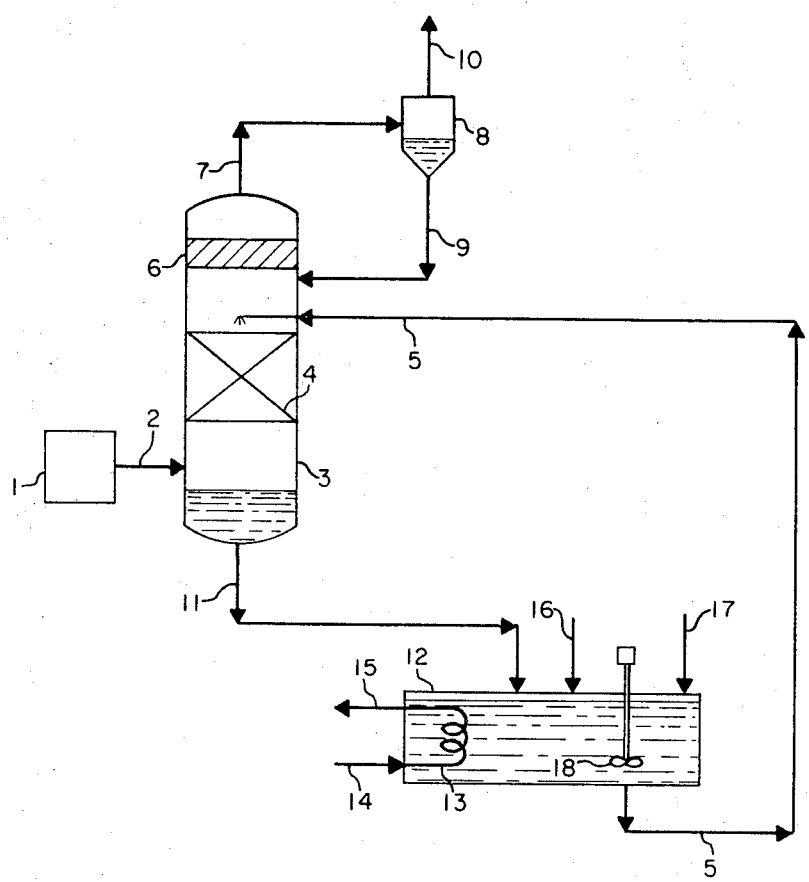
ABE WARSHAW
INVENTOR.
BY *J. T. Chaboty*
AGENT United States Patent Office 3,565,575
Patented Feb. 23, 1971

3,565,575
REMOVAL OF NITROGEN OXIDES
FROM A GAS STREAM
Abe Warshaw, Matawan, N.J., assignor to Chemical Construction Corporation, New York, N.Y., a corporation of Delaware
Filed May 22, 1968, Ser. No. 731,155
Int. Cl. B01d 53/00
U.S. Cl. 23—2
5 Claims

ABSTRACT OF THE DISCLOSURE

A gas stream containing nitrogen oxides, such as the tail gas from a nitric acid plant, is scrubbed with an aqueous urea solution. The nitrogen oxides dissolve in the solution to form nitrous acid, which reacts with the urea to form nitrogen, carbon dioxide and water. The resulting scrubbed gas stream is of reduced nitrogen oxides content and, in the case of nitric acid plant tail gas, may be safely discharged to the atmosphere without causing air pollution.

BACKGROUND OF THE INVENTION

Field of the invention

The invention relates to the treatment of gas streams containing nitrogen oxides, such as the tail gas from a nitric acid plant or the off-gas from an organic nitration process or the like, in order to reduce or substantially eliminate the nitrogen oxides content of the gas stream.

Description of the prior art

Various industrial processes such as the production of nitric acid and the nitration of organic compounds produce waste gas streams containing small proportions of nitrogen oxides, principally as nitric oxide and nitrogen dioxide. The concentrations of nitrogen oxides in such waste or stack gas streams is too small to be economically recovered. Discharge of such waste gas streams into the atmosphere is highly objectionable, since the nitrogen oxides are toxic, corrosive, and act as atmospheric pollutants. Thus, such waste gas streams must be treated in order to eliminate nitrogen oxides prior to discharge of the waste gas stream into the atmosphere. The usual approach is to catalytically react the waste gas stream containing nitrogen oxides with a reducing gas such as methane or hydrogen. Methane or natural gas principally consisting of methane is generally employed, due to economic considerations. The catalyst generally employed is an expensive platinum group metal such as platinum, palladium rhodium, ruthenium, osmium or iridium, or a mixture of such metals. The catalyst may be in the form of unsupported wire wesh, however the catalyst is generally supported on a suitable carrier such as alumina pellets, nichrome wire or silica gel. The catalytic reaction of the nitrogen oxides with the reducing gas results in the elimination of the nitrogen oxides, with the formation of free nitrogen and water vapor and/or carbon dioxide. When free oxygen is also present in the waste gas stream, as in the case of a tail gas from a nitric acid process, the free oxygen preferentially reacts with the reducing gas before the nitrogen oxides, and must be eliminated before the destruction of the nitrogen oxides can take place, which results in a wasteful consumption of the reducing gas. In any case, a final waste gas stream substantially free of nitrogen oxides and suitable for discharge into the atmosphere is produced. The treated tail gas from a nitric acid process, when freed of nitrogen oxides, is also usable as a nitrogen source for ammonia synthesis.

Prior art processes involving catalytic combustion of nitrogen oxides include U.S. Pat. No. 2,970,034 and U.S. patent application No. 409,507 filed Nov. 6, 1964, and issued as U.S. Pat. No. 3,467,492.

SUMMARY OF THE INVENTION

In the present invention, a waste or stack gas stream containing nitrogen oxides is scrubbed with an aqueous acidic urea solution. The nitrogen oxides dissolve in the aqueous acidic solutoin and form nitrous acid, which reacts with the dissolved urea to form innocuous reaction products consisting of nitrogen, carbon dioxide and water. The resulting product gas stream of reduced or negligible nitrogen oxides content may be safely discharged to atmosphere or utilized for any desired purpose, since the product gas is an inert gas stream principally containing nitrogen. The spent scrubbing solution is recycled for further scrubbing, after addition of make-up area.

The principal advantages of the process as compared to the prior art are that the process does not involve high cost catalysts or high temperature equipment. In addition, the process is economical and employs urea, which is a bulk chemical readily available in tonnage quantities.

It is an object of the present invention to remove nitrogen oxides from a gas stream in an improved manner.

Another object is to provide an improved process for removing nitrogen oxides from a gas stream.

A further object is to process the tail gas stream from a nitric acid process, so that the nitrogen oxides content of the tail gas is substantially eliminated and the tail gas is rendered innocuous.

An additional object is to provide an improved process for treating nitric acid plant tail gas which does not require high cost catalysts or high temperature equipment.

Still another object is to chemically react the nitrogen oxides content of a gas stream so as to produce innocuous reaction products.

These and other objects and advantages of the present invention will become evident from the description which follows.

DESCRIPTION OF THE DRAWINGS AND PREFERRED EMBODIMENTS

Referring to the drawing, a flowsheet of a typical application of the process of the present invention to the tail gas from a nitric acid plant is presented. The process source 1, which typically consists of a nitric acid facility, discharges a gas stream 2 containing nitrogen oxides, generally as nitric oxide and nitrogen dioxide. When source 1 is a nitric acid plant which produces nitric acid by the catalytic oxidation of ammonia, stream 2 will consist of the tail gas from the nitrogen oxides absorber.

Stream 2 is passed into gas-liquid contact tower 3 below section 4, which usually consists of a bed of suitable packing such as rings, spheres or saddles. In other instances, section 4 may consist of other gas-liquid contact means such as bubble cap plates or sieve trays. In any case, the gas stream rises through section 4 countercurrent to the liquid stream 5 which is sprayed or otherwise dispersed into tower 3 above section 4. Stream 5 consists of an aqueous acidic urea solution, and stream 5 typically contains in the range of about 1 gram to 30 grams of dissolved urea per 100 ml. of solution, together with dissolved free acid in a proportion up to about 10% by volume. Any suitable free acid which ionizes in aqueous solution may be present in stream 5, and the free acid may be an inorganic or organic acid. Conventional acidic agents such as nitric acid, sulfuric acid, hydrochloric acid or acetic acid are preferred. In most instances, stream 5 will be at an initial temperature in the range of 30° to 90° C., and it has been determined that the reaction rate of the reaction which takes place in section 4 increases at higher temperatures. Consequently, stream 5 will usually be a hot aqueous acidic urea solution, which may even be heated to a temperature above 90° C., and in some instances stream 5 will be at a temperature above 50° C.

The reaction between the gaseous and liquid phases which takes place in section 4 results in the dissolving of nitrogen oxides in the liquid phase, with the resultant formation of nitrous acid in solution. The nitrous acid and dissolved nitrogen oxides react with the dissolved urea, and in the acid solution the reaction products are nitrogen, carbon dioxide and water, which are innocuous components. The resulting gaseous phase rising within tower 3 above section 4 is now substantially free of nitrogen oxides, however the gaseous phase contains entrained liquid droplets which must be removed prior to discharge or further utilization of the gas stream. The gas stream flows through mist separator 6, which consists of one or a plurality of wire mesh filter pads or other suitable mist removal devices. The separated liquid phase flows downwards from section 6 into section 4, while the resulting mist-free gaseous phase is discharged from the top of tower 3 via stream 7. In some instances, stream 7 is now suitable for discharge to atmosphere, however stream 7 is usually passed through cyclonic gas-liquid separator 8 for the removal of residual liquid droplets. The separated liquid phase is recycled to unit 3 below section 6 via stream 9, while the liquid-free gaseous phase stream 10, which is of a substantially innocuous composition, is discharged to atmosphere or further utilized as desired.

Returning to tower 3, the spent scrubbing solution is removed from the bottom of tower 3 via stream 11, which flows into mixing tank 12 in which the solution is prepared for further gas scrubbing. The body of liquid solution in tank 12 is heated by heating coil 13, through which steam or other suitable heating fluid is circulated via stream 14, with condensate water or cooled fluid being removed via stream 15. Makeup solid urea or aqueous urea solution is passed into tank 12 via stream 16, and a water stream 17 may also be passed into tank 12 to compensate for water losses from the circulating solution in tower 3. The body of aqueous solution in tank 12 is stirred and mixed in tank 12 by agitator 18, in order to dissolve and blend the streams 16 and 17 into the aqueous solution. Regenerated solution is withdrawn from tank 12 via stream 5, which is passed to tower 3 as described supra.

Numerous alternatives within the scope of the present invention will occur to those skilled in the art. The ranges of process variables such as temperature and solution strength mentioned supra constitute preferred embodiments of the present invention, for optimum utilization of the process concepts of the invention, and the process of the present invention may be practiced outside of these ranges in suitable instances.

Examples of laboratory and industrial application of the process of the present invention will now be described.

Example I

A 10% slightly acidic urea solution was used to scrub the exit gas from an experimental nitric acid pilot plant. The gas was scrubbed in a tall form gas scrubber consisting of a vertical cylindrical vessel charged with a column of solution and provided with a lower sintered glass sparger. One ml. of dilute sulfuric acid was added to the solution per 30 ml. of 10% aqueous urea solution.

The tail gas bubbled upwards through the tall form gas scrubber at approximately 100 ml. per minute. The scrubbed gas was sampled in a 2,000 ml. evacuated flask and treated with 1.5% hydrogen peroxide solution. The quantity of nitrogen oxides was determined by titration of the nitric acid formed and compared to the result obtained from the analysis of the unscrubbed tail gas. Following are the test results, with gas flow constant at 100 ml. per minute.

TABLE I.—PILOT PLANT TEST RESULTS

| Test No. | 1[1] | 2 | 3 | 4 |
|---|---|---|---|---|
| Ml. of 10% solution in scrubber | 300 | 800 | 800 | 800 |
| Height of solution in scrubber, inches | 8 | 12 | 12 | 12 |
| Total urea in scrubber, grams | 30 | 80 | 80 | 80 |
| Unscrubbed gas, percent N oxides | 0.346 | 0.024 | 1.017 | 0.035 |
| Scrubbed gas, percent N oxides | 0.005 | 0.000 | 0.016 | 0.025 |
| Urea solution temp., °C | 40 | 60 | 60 | 30 |

[1] Two low form scrubbers in series were employed.

It is evident from the test results in Table I that the reaction rate and degree of effectiveness of the nitrogen oxides removal increases with higher temperature of the scrubbing solution.

Example II

The process of the present invention was designed for application to the scrubbing of the tail gas from a commercial 180 standard ton per day (100%) nitric acid facility, which produced 395 standard cubic meters per minute (measured at 15° C., 1 atmosphere) of tail gas at 7.52 kg./sq. cm. which contained on analysis 0.22% nitric oxide, 95.76% nitrogen, 3.00% oxygen and 1.02% water vapor. Referring to the figure, following is pertinent data relative to principal process streams.

TABLE II.—COMMERCIAL-SIZE FACILITY

| Stream No. | Temp., °C. | Flow rate as specified, kg./hr. | Composition as specified |
|---|---|---|---|
| 2 | 40 | 28,000 | 0.22% nitric oxide, 95.76% nitrogen 3.00% oxygen, 1.02% water vapor |
| 5 | 66 | 7,323 | 10% aqueous acidic urea solution. |
| 10 | 66 | 28,523 | |
| 11 | 40 | 6,800 | |
| 14 | 121 | 292 | 2.1 kg./sq. cm. saturated steam. |
| 16 | Ambient | 68.0 | Solid urea makeup. |
| 17 | Ambient | 455 | Makeup water. |

I claim:
1. A process for treating a gas stream containing nitric oxide and nitrogen dioxide to produce a product gas stream of reduced nitrogen oxides content which comprises scrubbing said gas stream with an aqueous urea solution, said urea solution containing an added and dissolved free acid selected from the group consisting of nitric acid, sulfuric acid, hydrochloric acid and acetic acid, whereby said nitrogen oxides form nitrous acid in said urea solution and said nitrous acid reacts with urea to form nitrogen, carbon dioxide and water, separating a product gas stream of reduced nitrogen oxides content from the resulting spent scrubbing solution, adding makeup urea to said spent scrubbing solution, and recycling the resulting solution as said aqueous urea solution for further scrubbing of said gas stream.

2. The process of claim 1, in which said gas stream containing nitric oxide and nitrogen dioxide is a tail gas stream discharged from the nitrogen oxides absorber in a process for the production of nitric acid by catalytic ammonia oxidation.

3. The process of claim 1, in which said aqueous urea solution contains in the range of about 1 gram to 30 grams of dissolved urea per 100 ml. of solution.

4. The process of claim 1, in which said aqueous urea solution contains dissolved free acid in a proportion up to about 10% by volume.

5. The process of claim 1, in which said aqueous urea solution is at an initial temperature in the range of about 30° C. to 90° C.

References Cited

FOREIGN PATENTS 186,985  11/1966  U.S.S.R. _____ 23—2

EARL C. THOMAS, Primary Examiner

U.S. Cl. X.R.

23—150, 159